W. A. BREWER.

CAR ROOF.

APPLICATION FILED JULY 30, 1919.

Reissued Oct. 14, 1919. 14,734.

2 SHEETS—SHEET 1.

Witness.

R. P. Brockway

Inventor

Wm. A. Brewer,

By Carr & Carr his Attorney

W. A. BREWER.

CAR ROOF.

APPLICATION FILED JULY 30, 1919.

Reissued Oct. 14, 1919. 14,734.

2 SHEETS—SHEET 2.

Witness

R. L. Armstrong

Inventor

Wm A. Brewer

By Carr & Carr his Attorneys

UNITED STATES PATENT OFFICE.

WILLIAM A. BREWER, OF PITTSBURGH, PENNSYLVANIA, ASSIGNOR TO P. H. MURPHY COMPANY, OF PARNASSUS, PENNSYLVANIA, A CORPORATION OF PENNSYLVANIA.

CAR-ROOF.

14,734. Specification of Reissued Letters Patent. Reissued Oct. 14, 1919.

Original No. 1,296,913, dated March 11, 1919, Serial No. 264,084, filed November 25, 1918. Application for reissue filed July 30, 1919. Serial No. 314,280½.

*To all whom it may concern:*

Be it known that I, WILLIAM A. BREWER, a citizen of the United States, and a resident of the city of Pittsburgh, in the county of Allegheny and State of Pennsylvania, have invented a new and useful Improvement in Car-Roofs, of which the following is a specification.

This invention relates to outside metal car roofs and is an improvement on the type of roof illustrated in the C. C. Murphy Patent No. 1,133,493 dated March 30, 1915. In the above roof, the eaves ends of the transverse seam caps are held in position on the substructure by means of angle clips, which are bolted to the side fascia and bear on top of the seam caps. In actual practice, these bolts sometimes extend through the side plates of the car, thus permitting water to follow the bolts and reach the interior of the car and cause the lading carried therein to become damaged. During the service of the car, these clips are liable to work loose and swing to one side, thus permitting the eaves ends of the transverse seam caps to lift up off the substructure and impair the weather-proofing qualities of the roof. The saddle bolts also are liable to work loose, thereby causing the ridge ends of the transverse seam caps to become disengaged from the center caps and permit the seam caps to slide completely off the car. There is also a practical difficulty in preventing leaks at the joints between the ridge seam cap and the sheet anchor saddle, and at the joints between the center caps and the running board saddles, when the securing bolts at these points become loose, as in the case of shrinking of the sheating and ridge pole. Another cause of leakage at these joints lies in slight variations in the milling of the saddles, in consequence of which said saddles are liable to bear against the boss around the bolt hole in the ridge cap and center cap and force said caps downwardly instead of fitting over said boss properly.

The principal objects of the present invention are to overcome the disadvantages hereinbefore mentioned; to loosely secure the eaves ends of the transverse seam covers to the substructure without the use of separate securing clips and thereby eliminate all bolt holes in the side plates; to reduce the cost of manufacture and application of the roof; and to simplify the construction. The invention consists principally in the improved transverse seam cap and in the manner of securing the same at the ridge and eaves ends of the car; it also consists in the means for clamping the ridge seam caps and center caps to the respective running board and anchor saddles; and it also consists in the combinations and arrangements of parts hereinafter described and claimed.

In the accompanying drawings, wherein like reference numerals refer to like parts wherever they occur, Figure 1 is a plan view of a portion of a car roof embodying my invention, parts being broken away to more clearly illustrate the invention;

Figure 1:
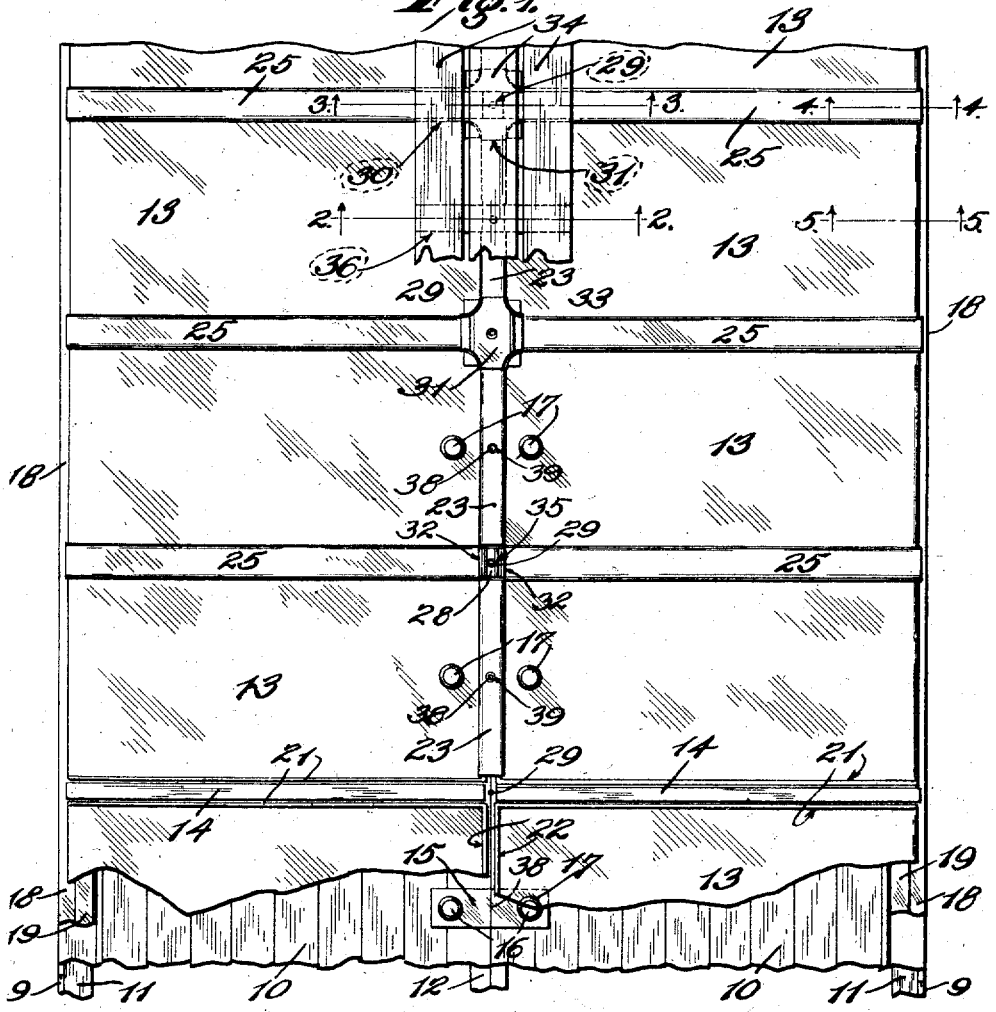
Figure 2:
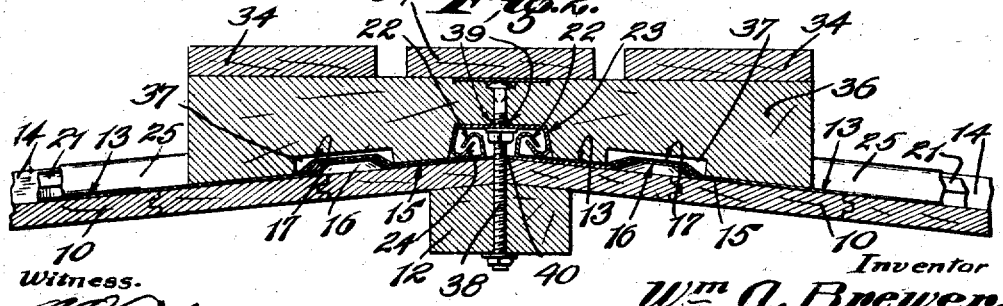
Fig. 2 is an enlarged transverse section of the roof at the ridge, the section being taken through one of the anchor saddles on the line 2—2 in Fig. 1.
Figure 3:
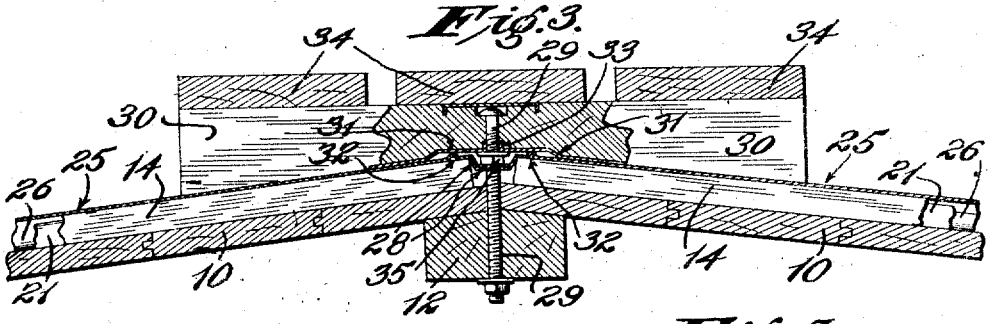
Fig. 3 is a transverse section of the roof at the ridge, the section being taken through one of the running board saddles on the line 3—3 in Fig. 1.
Figure 4:
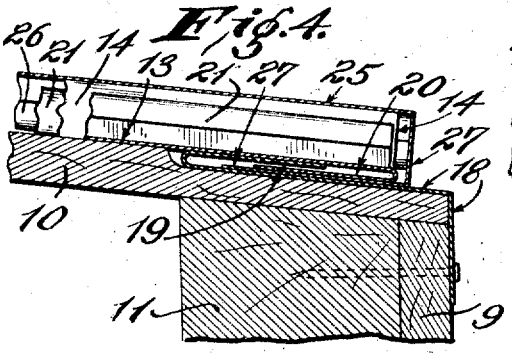
Fig. 4 is a vertical cross-section of the roof at the eaves, the section being taken through the transverse seam cap on the line 4—4 in Fig. 1.
Figure 5:
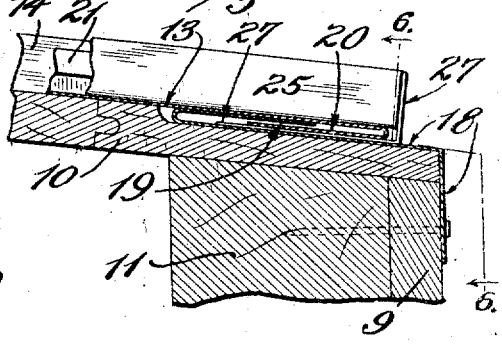
Fig. 5 is a vertical cross-section of the roof at the eaves, the section being taken between the transverse seams on the line 5—5 in Fig. 1.
Figure 6:
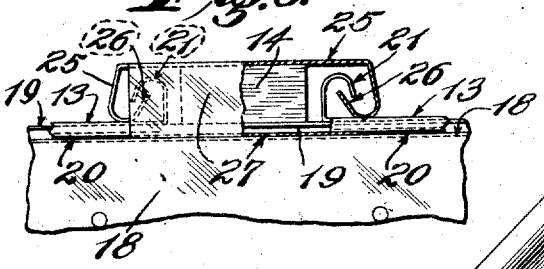
Fig. 6 is a side elevation of the eaves portion of the roof at the end of one of the transverse seams, the end of the transverse seam cap being broken away and shown in vertical section on the line 6—6 in Fig. 5.
Figure 7:
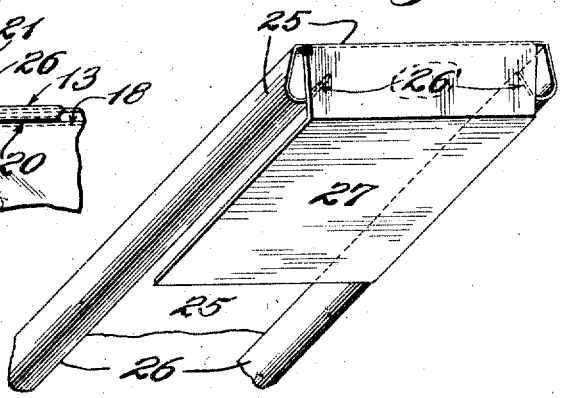
Fig. 7 is a perspective view of the eaves end of one of the transverse seam caps.
Figure 8:
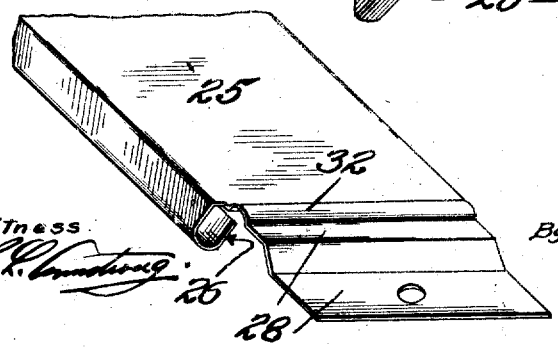
Fig. 8 is a perspective view of the ridge end of a transverse seam cap.

In the accompanying drawings, a metal roof embodying my invention is shown applied to the ordinary type of car comprising side sheathing 9, roof sheathing 10 supported at the eaves on side plates 11, and at the ridge by means of a ridge pole 12. The metal roof sheets 13 are arranged in pairs end to end on opposite sides of the ridge; the sheets being spaced apart at the ridge and extending to the eaves of the car. Each pair of roof sheets is spaced from the adjacent pairs at their sides, and between the spaces thus formed are arranged mullions or battens 14, the width of the mullions being less than the space between the roof sheets. These mullions are arranged transversely of the car and extend from the eaves to within a short distance of the ridge on each side of the car.

Each pair of oppositely disposed roof sheets is pivotally mounted on the roof substructure by means of sheet metal anchor plates 15 which straddle the ridge of the roof and have upstanding bosses 16 formed therein, which project into similar bosses 17 formed in the roof sheets near their ridge ends. The eaves ends of the roof sheets are loosely secured to the substructure by means of angle flashing strips 18. These flashing strips rest in a rabbet formed in the eaves ends of the roof sheathing and extend from end to end of the car passing beneath the mullions and the transverse seam caps. The vertical flange of the flashing strip is nailed or otherwise secured to the side of the car and the portion of the strip resting in the rabbet is doubled-back upon itself, as at 19, and the eaves ends of the roof sheet are doubled-under, as at 20, and hooked into the doubled-back portion of the flashing strip.

The side and ridge margins of the roof sheets are flanged up and turned in and down forming hooked flanges 21 and 22. Inverted channel-shaped ridge seam caps 23 straddle the spaced ridge margins of each adjacent pair of roof sheets and have their lower side margins flanged inwardly and upwardly forming hooked flanges 24 adapted to interlock with the hooked flanges 22 formed in the ridge margins of each sheet. The side margins of the roof sheet adjacent to the mullions 14 are covered by transverse seam caps 25, which are similar in cross-section to the ridge seam caps 23. The transverse seam caps straddle the mullions 14 and the side margins of the adjacent sheets and have inwardly and upwardly extending hooked flanges 26 similar to the flanges 24 of the ridge seam caps adapted to interlock with the hooked flanges 21 formed on the side margins of the roof sheets. The eaves ends 27 of the top portions of the transverse seam caps are bent down over the end of the mullions 14 and then turned under the adjacent doubled-under flanges 20 of the roof sheets located on each side of the mullions. Due to the relative movement of the transverse seam caps with respect to the roof sheets, there is a possibility of the turned-down portion 27 of the seam cap slipping from beneath the doubled-under portion 20 of the roof sheets, thereby causing the side margins of these parts to butt against each other and damage the cap or sheets. This danger is avoided by making the turned-down portion 27 of the transverse seam cap wider than the distance between the side margin of the roof sheets when the sheets are shifted in opposite directions. The top portions of the transverse seam caps have extensions 28 which lap at the ridge and are perforated to receive the saddle bolts 29 of the running board saddle 30.

The ends of the ridge seam caps and the ridge ends of the transverse seam caps are covered by the usual pan-shaped four-way center or corner caps 31 having an opening in each of their four walls to receive the ends of the ridge and transverse seam caps. The extensions 28 at the ridge ends of the transverse seam caps have upstanding corrugations 32 extending cross-wise of the extensions which are adapted to bear against the under side of the center caps 31 to prevent water being blown under the center cap and reaching the interior of the car. These center caps have center holes in their top walls surrounded by upstanding bosses 33 through which the saddle bolts 29 pass. Running boards 34 are secured to the running board saddles 30 which rest on the transverse seam caps and are supported on the mullions 14 arranged beneath the transverse seam caps, thus permitting movement of the sheets under the transverse and ridge seam caps. The running board saddles are secured to the substructure by the saddle bolts 29 which extend down through the roof sheathing and ridge pole and are threaded to within a short distance of their head portions. The under sides of the running board saddles are recessed to receive the center caps which are secured thereto by means of clamping nuts 35. These clamping nuts are threaded on the saddle bolts 29 and are adapted to bear against the under side of the center cap 31 so as to draw the upstanding flange surrounding the bolt hole in the center cap up into the under side of the running board saddle thereby preventing leakage at these points. The lapped portions 28 at the ridge ends of the transverse caps are offset downwardly to provide space for the clamping nut 35 which clamps the center cap to the under side of the running board saddle.

The bosses 17 in the roof sheets are held down on the bosses 16 in the anchor plate 15 by means of intermediate running board saddles or anchor saddles 36 which have their under sides shaped to fit the pitch of the roof and are provided with circular recesses 37 adapted to fit over the bosses 17 of the roof sheets. The anchor saddles 36 straddle the ridge seam covers and are secured to the substructure by bolts 38 which extend downwardly through bossed-up holes 39 in the top of the ridge seam caps. The bolts are threaded the greater portion of their length and the ridge seam caps are secured to the under side of the anchor saddles by clamping nuts 40, the tightening of which causes the flange surrounding the holes in the ridge seam cap to be drawn into the under side of the anchor saddle.

By the arrangement described, the ridge seam caps and center caps can be clamped firmly to their respective saddles and a tight water-proof joint between these members obtained irrespective of slight variations in the milling of the saddles. This arrangement also permits the ridge seam cap and center cap to be attached to the saddles before and independently of the attachment of the saddles to the car.

The turning of the eaves ends of the transverse seam under the eaves ends of the roof sheets, which in turn are loosely held down at the eaves by the eaves flashing strips, eliminates the use of all clips and bolts, and overcomes the difficulty formerly encountered in applying these clips to cars having metal side plates. This turning under of the eaves ends of the transverse seam caps also permits the sheets and caps to shift in opposite directions within certain limits without becoming disengaged from each other. The transverse seam caps are held in position on the car by means of the saddle bolts 29 which pass through the lapped ridge ends of the seam caps.

I do not wish to be limited to the exact construction hereinbefore described, as the invention is applicable to roofs having different forms of ridge and side seams.

What I claim is:

1. A car roof comprising roof sheets arranged transversely of the car, said roof sheets being movably secured to the car at the eaves, seam caps movably connecting the adjacent side margins of the said roof sheets, the eaves ends of said seam caps having turned-under portions adapted to movably engage the under sides of the eaves ends of the roof sheets for holding said seam caps down on the car.

2. A car roof comprising roof sheets arranged transversely of the car, said roof sheets being loosely secured to the car at the eaves and having their side margins spaced apart, seam caps straddling the spaced side margins of said roof sheets, the eaves end portions of said seam caps being turned under the eaves ends of the roof sheets for holding said seam caps down on the car.

3. A car roof comprising spaced roof sheets having doubled-under flanges at their eaves ends, a flashing strip secured to the eaves of the car and adapted to be hooked into the doubled-under flange of the roof sheet, seam caps adapted to span the margins of adjacent roof sheets, the ends of said seam caps being bent under the doubled-under flanges of adjacent roof sheets to loosely retain the caps in position.

4. A car roof comprising roof sheets arranged crosswise of the car, said roof sheets being loosely secured on top of the car at the eaves and having their side margins spaced apart, mullions arranged in the spaces between said sheets and spaced from the side margins thereof, seam caps arranged on opposite sides of the ridge and adapted to straddle the mullions and the spaced side margins of said roof sheets, the adjacent ridge ends of said caps being lapped at their ridge ends and secured to the car substructure, the eaves ends of said caps being turned under the eaves ends of said roof sheets whereby said seam caps are held down on the car.

5. A car roof comprising spaced roof sheets arranged crosswise of the car, said roof sheets being secured at the eaves on top of the roof substructure, seam caps loosely connecting the side margins of the roof sheets, said seam caps extending from ridge to eaves on opposite sides of the car and being lapped at their ridge ends, the eaves ends of said caps being turned under the eaves ends of said roof sheets, running board saddles located above said seam caps, center caps adapted to straddle the lapped ridge portions of the seam caps, and means for securing said center caps to said running board saddles, said means extending through the lapped ridge portions of the seam caps and secured to the roof substructure whereby the running board saddles and center caps can be assembled and removed together.

6. A car roof comprising roof sheets arranged on opposite sides of the ridge with their side margins spaced apart, said roof sheets being loosely secured at the eaves on top of the car and connected along their ridge margins by flexible joints, transverse seam covers loosely connecting the side margins of said roof sheets, said transverse seam covers being arranged on opposite sides of the car with their ridge ends lapped and having upstanding corrugations arranged crosswise adjacent to their lapped portions, said transverse seam caps being bent under the eaves ends of the sheets for retaining them in position, center caps covering the lapped ridge portions of the tranverse seam and the ends of the flexible ridge joints of the roof sheets, said transverse seam caps adapted to bear against the under side of the center caps, running board saddles resting on said transverse seam caps, and means for clamping said center cap to the running board saddles, said means extending downwardly through the lapped ridge ends of the transverse seam caps and secured to the roof substructure.

7. An outside metal car roof comprising sheets spaced apart at the ridge, ridge caps connecting the adjacent ridge margins of said roof sheets, running board saddles resting on said caps and having an extension extending downwardly therefrom for attachment of said saddle to the car substructure, and separate means on said extension for clamping said seam cap to the running board saddle.

8. An outside metal car roof comprising roof sheets spaced apart at the ridge and at their side margins, ridge seam caps connecting the adjacent ridge margins of said roof sheets, transverse seam caps connecting the adjacent side margins of said roof sheets on each side of the ridge, ridge center caps covering the ridge ends of the transverse seam covers and the adjacent ends of the ridge seam caps, running board saddles resting on said transverse seam caps, intermediate saddles resting on said ridge seam caps, said running board saddles and intermediate saddles having downwardly extending threaded extensions for attachment to the car substructure, and separate means on said threaded extensions for clamping said ridge seam caps and ridge center caps to their respective saddles.

9. An outside metal car roof comprising roof sheets spaced apart at the ridge, ridge caps loosely connecting the adjacent ridge margins of said roof sheets, said ridge caps having bossed up holes formed in their top portions, running board saddles straddling said ridge caps, bolts for attaching said saddles to the car substructure extending downwardly through said saddles and bossed up holes of the ridge caps, and separate means on said bolts for clamping said ridge cap to said running board saddles.

10. An outside metal car roof comprising roof sheets extending from ridge to eaves and connected along their side and ridge margins by flexible joints, ridge corner caps covering the ridge corners of said roof sheets and flexible joints, running board saddles located above said ridge corner caps, bolts for attaching said saddles to the car substructure, said bolts extending downwardly through said saddles and ridge corner caps, and separate means on said bolts for clamping said corner caps to said running board saddles.

11. The combination of a ridge cap and a running board saddle for a car roof, said ridge cap having an upstanding boss in its top portion adapted to be drawn into the under side of said running board saddle, and a bolt for attaching said saddle to the car roof, said bolt extending downwardly through said saddle and the upstanding boss of the ridge cap, and adjustable clamping means on said bolts for clamping the ridge cap to the running board saddle whereby said cap may be clamped to said saddle before the saddle is attached to the car roof.

12. The combination of a ridge corner cap and a running board saddle for a car roof, said ridge corner cap having an upstanding boss in its top portion adapted to be drawn into the under side of said running board saddle, and a bolt for attachment of said saddle to the car roof, said bolt extending downwardly through said saddle and the upstanding boss of the ridge corner cap, and adjustable clamping means on said bolt for clamping the corner cap to the running board saddle whereby said corner cap may be clamped to said saddle before the saddle is attached to the car roof.

13. A car roof comprising roof sheets arranged transversely of the car, flashing strips extending beneath said sheets and secured to the eaves of the car and having doubled-back flanges, seam covers adapted to span the side margins of adjacent roof sheets, the eaves ends of said seam covers being bent under the doubled-back flanges of the eaves flashings to loosely retain said seam caps in position.

14. A car roof comprising roof sheets arranged transversely of the car, said roof sheets being movably secured to the car at the eaves, transverse seam covers movably connecting the adjacent side margins of said roof sheets, said seam covers having upstanding corrugations arranged crosswise of the ridge portion, center caps secured to the car at the ridge, said center caps covering the corrugations in the ridge portions of said seam covers, the corrugations at the ridge ends of said seam covers being adapted to bear against the under sides of the center caps.

15. A car roof comprising roof sheets arranged on opposite sides of the ridge with their side margins spaced apart, said roof sheets being loosely secured to the car at the eaves, and connected along their ridge margins by flexible joints, transverse seam covers loosely connecting the spaced side margin of the roof sheets, said transverse seam covers being arranged on opposite sides of the car with their ridge ends lapped and having upstanding corrugations arranged crosswise adjacent to their lapped portions, center caps covering the lapped ridge ends of the adjacent seam covers and having recesses in their under sides, the corrugations adjacent to the lapped ridge end of said seam cover being adapted to bear against the under sides of the recess in the under sides of said center caps.

16. A car roof comprising roof sheets arranged on opposite sides of the ridge, said roof sheets being movably secured to the car at the eaves and being connected along their ridge margins by flexible joints, transverse seam covers loosely connecting the side margins of said roof sheets, said transverse seam covers having upstanding corrugations arranged crosswise of their ridge end portions, center caps secured to the car at the ridge, said center caps covering the ends of the flexible ridge joints of the roof sheets and the corrugations at the ridge ends of the adjacent seam covers, the corrugations of said seam covers being adapted to bear against the under side of the center caps.

17. A seam cover for a car roof, said seam cover being of inverted channel-shaped section and being adapted to span the side margins of adjacent roof sheets, said seam cover having an upstanding corrugation extending crosswise of its ridge end portion for the purpose set forth.

18. A seam cover for a car roof, said seam cover being of inverted channel-shaped section and being adapted to span the side margins of adjacent roof sheets, the top or web portion of said seam cover being extended beyond the side flanges at the ridge end thereof and having an upstanding corrugation extending crosswise thereof, the extended ridge portion of said seam cover being offset downwardly beyond the corrugation thereof.

19. A seam cover for a car roof, said seam cover being of inverted channel-shaped section and having inturned flanges projecting up from the lower edges of its side walls and having turned under portions at its eaves ends for loosely securing the seam cover to the car, the top or web portion of said seam cover being extended beyond the side flanges at the ridge ends thereof and said extended portion having an upstanding corrugation extending crosswise thereof.

Signed at Parnassus, Penna., this 25th day of July, 1919.

WILLIAM A. BREWER.